United States Patent [19]

Breton et al.

[11] 4,194,040

[45] Mar. 18, 1980

[54] ARTICLE OF FIBRILLATED POLYTETRAFLUOROETHYLENE CONTAINING HIGH VOLUMES OF PARTICULATE MATERIAL AND METHODS OF MAKING AND USING SAME

[75] Inventors: Ernest J. Breton; Jack D. Wolf; Dexter Worden, all of Wilmington, Del.

[73] Assignees: Joseph A. Teti, Jr.; William C. Teti, both of Philadelphia, Pa. ; part interest to each

[21] Appl. No.: 499,583

[22] Filed: Aug. 22, 1974

Related U.S. Application Data

[60] Division of Ser. No. 229,823, Feb. 28, 1972, Pat. No. 3,864,124, which is a continuation-in-part of Ser. No. 818,781, Apr. 23, 1969, abandoned.

[51] Int. Cl.² ............................ B32B 3/26; B32B 5/18
[52] U.S. Cl. ................................. 428/308; 428/309; 428/317; 428/325; 428/328; 428/329; 428/331; 428/421; 428/422; 264/122; 264/127; 260/42.27; 260/42.49; 75/211
[58] Field of Search ............... 428/308, 309, 317, 325, 428/328, 329, 331, 402, 403, 404, 421, 422; 264/44, 59, 122, 127; 75/211, 212; 260/33.6 F, 900, 42.27, 42.49

[56] References Cited

U.S. PATENT DOCUMENTS

| | | | |
|---|---|---|---|
| 3,005,795 | 10/1961 | Busse et al. | 260/900 |
| 3,281,511 | 10/1966 | Goldsmith | 264/127 |
| 3,533,930 | 10/1970 | Lawton et al. | 260/900 |
| 3,541,070 | 11/1970 | Ahrabi | 260/900 |
| 3,556,161 | 1/1971 | Roberts | 264/127 |
| 3,838,092 | 9/1974 | Vogt et al. | 260/900 |
| 3,853,690 | 12/1974 | McGarry et al. | 260/900 |
| 3,864,124 | 2/1975 | Breton et al. | 264/59 |

FOREIGN PATENT DOCUMENTS

| | | |
|---|---|---|
| 1594392 | 4/1973 | Fed. Rep. of Germany . |
| 49-94506 | 9/1974 | Japan . |

*Primary Examiner*—William R. Dixon, Jr.
*Attorney, Agent, or Firm*—Connolly and Hutz

[57] ABSTRACT

Articles of manufacture having good green strength and low modulii of elasticity, and comprising a matrix of fibrillated polytetrafluoroethylene interconnecting and entrapping a high volume, at least about 85%, of a particulate and preferably a sinterable material selected from the group consisting of metals, intermetallic compounds, ceramics, salts, plastics, and combinations thereof. Said articles are formed by mechanically working a substantially dry mixture of a fibrillable polytetrafluoroethylene polymer and a high volume, at least about 85%, of the particulate material. Metal, ceramic and plastic articles prepared by heat treating, such as sintering, the articles of manufacture are also disclosed.

The heat treated products are useful, inter alia, as structural elements and electronic components.

8 Claims, 4 Drawing Figures

ARTICLE OF FIBRILLATED POLYTETRAFLUOROETHYLENE CONTAINING HIGH VOLUMES OF PARTICULATE MATERIAL AND METHODS OF MAKING AND USING SAME

CROSS REFERENCE TO RELATED APPLICATION

This application is a divisional of application Ser. No. 229,823 filed Feb. 28, 1972 now U.S. Pat. No. 3,864,124 which application is in turn a continuation-in-part of application Ser. No. 818,781 filed Apr. 23, 1969, now abandoned.

BRIEF SUMMARY OF THE INVENTION

This invention is directed to an article of manufacture having good green strengths and low modulii of elasticity which comprises about 1 to 15%, by volume, of a fibrillated high molecular weight polytetrafluoroethylene polymer (hereafter "PTFE") and from about 85 to 99%, by volume, of a particulate material selected from the group consisting of metals, intermetallic compounds, ceramics, salts, plastics, or combinations thereof, preferably a particulate material which can be sintered or fused.

The invention is also directed to a process for preparing such articles of manufacture comprising mechanically working in substantially the dry state a mixture having about 1 to 15% by volume of PTFE, that is, a high molecular weight polymer of tetrafluoroethylene which forms fibrils when mechanically worked under the conditions hereinafter specified, and about 85 to 99%, by volume, of at least one of said particulate metals, intermetallic compounds, ceramics, salt, plastics or combinations thereof.

This invention is further directed to a process for preparing a heat treated, for example sintered, article of manufacture comprising heating a composition, having good green strengths, and low modulii of elasticity, containing about 1 to 15%, by volume, of PTFE and about 85 to 99%, by volume, of said particulate metals, intermetallic compounds, ceramics, plastics or combinations thereof at a temperature sufficient to sinter said metal, intermetallic compound, ceramic, plastic or combinations thereof and composites thereof. By "sinter" we mean to include fusion and melting of the particulate material.

The processes of this invention are useful in preparing flexible sheeting, rods and solid objects of metal intermetallic compounds, ceramics, plastics and combinations and composites thereof which can be shaped and sintered to form solid rigid articles of manufacture. The presintered sheet, especially the metal filled sheet, is useful as a radiation shield for beta and alpha particles, neutrons and x- and gamma radiation. The sintered articles are also useful as structural elements and electronic resistors and components.

DESCRIPTION OF THE PREFERRED EMBODIMENTS

The process of this invention comprises mechanically working, for example, by rolling, ball milling, stretching, elongating, spreading, and the like, a mixture of the PTFE and the particulate substance to form a sheet or mat having high green strength and low modulii of elasticity. This sheet or mat may then be shaped to a desired configuration and heated to a temperature where sintering (including fusion and melting) occurs.

In accord with this invention, PTFE is converted into a matrix of fibrils by mechanical working under the conditions specified. These fibrils have a diameter of less than 10 microns and generally having diameters and a ratio of length to diameter of 10 to 1 to 100 to 1 or greater. The sheet or mat produced is characterized by low modulii of elasticity, that is, a good cloth-like character of a good drapability and flexibility which permits it to fit closely around and conform to articles of various and diverse shapes despite its very high loading of particulate material. The filler particles in the presintered sheet according to the invention are not chemically or metallurgically bonded to each other in the flexible non-woven composition of this invention.

The mechanical working of the mixture in the manner disclosed causes the PTFE to become fibrillated and the resulting fibrils to capture and interconnect the particulate and perferably sinterable materials to produce a non-woven type of sheet or mat having good flexibility and high green strength. In other words, a three dimensional matrix of interwoven or interconnected fibrils having the particulate material uniformly distributed and interconnected therein is produced by mechanically working the aforesaid mixtures in the manner hereinafter disclosed.

The fibrillable PTFE polymer used in the process of this invention includes the high molecular weight polytetrafluorethylene resins produced by emulsion polymerization. These PTFE polymers have a broad molecular weight range of about 10 to 20 million and are commercially available products. The preparation of these polymers, which is described in U.S. Pat. Nos. 2,510,112; 2,587,357 and 2,685,707 involves well-known emulsion polymerization techniques wherein tetrafluoroethylene under pressure in water containing an emulsifying agent, is reacted with a water soluble free radical catalyst. The emulsion produced is coagulated, washed and then dried. The average particle size of the polymer is about 50 to 560 microns; polymer having larger or smaller average particle size is operative. The PTFE used to make the fibril containing composition is commercially available from E. I. duPont deNemours & Company, Wilmington, Del., as Teflon 6C.

In accord with the present invention, applicants have found that when PTFE is mixed with the particulate and preferably sinterable ingredient and this mixture is mechanically worked in essentially the dry state, that is, with the use of only a minor amount, and preferably in the absence of a lubricant, the mechanical working of the PTFE polymer and the particulate sinterable ingredients produces particulate material uniformly distributed or dispersed in a matrix of PTFE fibrils. The fibrils comprise an interconnecting network matrix which interconnects and binds the particulate and preferably sinterable material. It is believed that this matrix is formed by the application of a shearing force during mechanical working which, under the conditions specified, converts the PTFE particles into fibrils. The resulting matrix is believed to be essentially a three dimensional cobweb-like structure or a non-woven mat of intertwined fibrils which interconnect and entrap the individual particles of the particulate and preferably sinterable ingredient.

It has also been found that to produce the unique products according to this invention, one must employ a high volume of particulate material, at least about 85%, by volume, and one must conduct the mechanical working in the substantial and preferably complete absence of added liquid lubricants, that is, in the dry state. While some liquid such as water may be present in the particles due to normal water pick up from the atmosphere, the amount present is small and, in any event, is at such a level that it does not interfere with the fibrillation of the polytetrafluoroethylene during the processing steps of this invention.

It is theorized that in the initial stages of our mechanical working, the PTFE actually coats and adheres to at least a portion of the surface of a substantial number of the individual particles. As mechanical working progresses, a portion of this coating is pulled off of the coated particues through mechanical stress and polymer adherence to other particles, either directly to the particle surface or through an existing coating on the other particles. The PTFE polymer adheres to it in part and interconnects at least a substantial number of these particles to form the claimed highly flexible, high green strength sheets. The continued dry mechanical working at a high volume of particulate material thus causes fibrillation to occur and the particulate material, at least in substantial amounts, becomes interconnected and entrapped by the fibrils so produced. The cloth-like and highly drapable characteristics of the product combined with its good green strength which permits it to be handled result from this unique fibrillated structure which provided particle to particle bonding by the PTFE fibrils. The fibrils are able to flex within the spaces between the particles to give flexibility and yet are strong enough to give ultimate strength values sufficient for handling.

It has been reported in U.S. Pat. Nos. 3,556,161 and 3,281,511 that in the presence of lubricants during working a PTFE polymer matrix is formed as lamellae which mechanically entrap the particulate material. While we are not certain and do not intend to limit our invention, we theorize that the structural differences between fibrillated products according to our invention and lamellae as taught in the aforesaid patents may be caused by the failure, where high amounts of lubricant and relatively low loadings of filler are present such as in the processes of the aforementioned patents, of the PTFE to coat and adhere to the particles in the initial stages of mechanical working. Without adherence, the PTFE is essentially rolled by the individual particles to form a plate-like structure (or lamellae) which mechanically holds the particulate.

Photographic evidence of the structural differences as a function of filler content produced in accordance with the present invention is shown in the attached photomicrographs wherein.

Figure 1:
FIG. 1 is a photomicrograph at 3000× magnification of a composition employing 60 volume percent of a nickel based braze alloy consisting of spherical particles as particulate material.

The products produced by the present invention display many advantages over products produced by mechanical working in the presence of lubricants. One obvious advantage is the ability to add higher volumes of particulate materials than heretofore believed possible when proceeding in accordance with such processes as those disclosed in the aforesaid patents and in the U.S. Pat. No. 3,315,020. Regarding this latter patent, the present process is mechanically a simpler operation permitting at least an 85% by volume content of solid particulate material to be incorporated in the PTFE polymer while still producing a flexible composition. The particulate materials according to the present invention do not function as a normal filler to impart stiffness, rigidity or wear resistance and, quite to the contrary, the resulting product is flexible yet strong permitting it to conform to many shapes.

While we are aware that the art has recognized that PTFE can be biaxially oriented (cf. U.S. Pat. Nos. 3,315,020 and 3,486,961 and British Pat. No. 989,022), we believe we are the first to describe a practical method for producing a novel fribillated PTFE matrix which interconnects and entraps high volumes of at least 85% and preferably at least 95% particulate material which preferably can be sintered, fused or melted to form a self-supporting product of the type herein described. Products of this invention containing 99%, by volume, particulate are flexible and self-supporting.

Cross-rolling of a ball milled or mulled mixture of PTFE and particulate filler is a preferred method of mechanically working the mixture to produce the flexible compositions of this invention. To produce a sheet having good tensile strength, the ball milled mixture is rolled between pressure rolls in one direction. Then the sheet formed thereby is folded and the folded sheet is rolled in a direction at about 90 degrees to the axis of the first rolling step (i.e. cross rolled). Each rolling step decreases the thickness of the mat or sheet. The cross-rolling procedure using large quantities of solvent has been described in U.S. Pat. No. 3,281,511. The process of this invention involves essentially the same cross rolling steps but without solvent and, preferably, using pressure rolls heated in the range of 25° to 200° C. or higher and, preferably, at 80° to 150° C. Generally, at least one of the pressure rolls has a diameter of 0.5 to 8 inches or larger and, preferably, 1 to 6 inches and most preferred, 1 to 3 inches.

Cross rolling may be repeated from about three to twenty times or more, or at least until the desired high green strength and flexible product above described is obtained. Occasionally, some mixtures develop the desired coherent sheet after only one cross rolling step.

The process according to the present invention can be modified to improve the tensile strength in two directions by adding to the mixture, during the initial mixing step, a reinforcing fiber, for example, a high molecular weight organic polymeric fiber, such as nylon, polyesters, polyfluorocarbons, ceramic fibers such as glass, alumina, silica, corundum fibers and the like, metal wires and fibers and intermetallic compounds in the form of a fiber. The matrix-containing objects containing reinforcing fibers can be fused or sintered into solid objects containing reinforcing fibers.

The matrix-containing coherent film, sheet or mat can be readily shaped into rigid form by cold compressing at pressures of 50,000 to 200,000 pounds per square inch or higher pressures.

It was unexpected that strong, coherent sheets including thin flexible films having thicknesses of, for example, as low as 1 to 3 one thousands of an inch and containing high loading, i.e. 85 to 99%, by volume, of particulate material could be produced. The ability to produce films and more particularly thin films, and sheets having the high loading is desirable since there is less shrinkage of the resulting objects produced by heating to temperatures where fusion or sintering occurs. High loadings of fusible or sinterable materials, i.e. in the range of 85 to 99%, by volume, can preferably be made from fillers having a particle size distribution selected to minimize voids. For example, voids can be minimized when 10%, by volume, and, preferably 40 to 80%, by volume, of the particulate material have an average particle diameter of less than 10 microns. Generally, the particle size of the filler may preferably range from about 0.1 to 200 microns. Dry mixing of the mixture with a grinding media can facilitate the development of green strength of the mixtures having high loadings of sinterable material, including those up to 95 to 99%, by volume.

It is sometimes desirable to mechanically work the particulate mixtures by a puncturing or indenting step coupled with cross rolling. The puncturing is produced by rods having a diameter of 1/16 to ¼ inch although rods of 1/64 to ½ inch are operative. Preferably, the entire sheet is punctured or indented by rods spaced ¼ to 1 inch from each other, however, the rods can be spaced from 1/32 to 2 inches from each other. The puncturing or indenting step produces sheets having greater strength normal to the plane of rolling and in the case of sheets formed from repeated folding and cross rolling steps, much less propensity to delaminate. Additionally, laminates prepared by puncturing or indenting and pressing, in general, are more flexible and have higher tear resistance.

The sheets of this invention can be finished by rolling between polished rolls spaced at distances slightly less than the thickness of the sheet.

It has been found that the tensile strength of the flexible film or sheet of this invention is lowered by prolonged application of a shearing force and compression force. Films or sheets produced by prolonged rolling conditions which can have lowered tensile strength are still usable to produce solid objects by sintering or coating, and the number of rolls will be generally selected in such a manner as to produce the flexible products according to this invention in the most economical manner while achieving the individual characteristics as desired.

Intermetallic compounds preferred in this invention are those sintering above 400° C. These are described in Hansen, Constitution of Binary Alloys, McGraw-Hill, New York, 1958 and Elliott, First Supplement of Hansen's Constitution of Primary Alloys, McGraw-Hill, New York, 1965.

Ceramics powders usable herein are further described, Levin, Phase Diagram for Ceramists, American Ceramic Society, Inc., Columbus, Ohio, 1964.

Plastics which can be used are those in the form of particulates that can be fabricated by heating. They include polyamides such as polyhexamethyleneadipamide, poly(bismethylcyclohexylene) dodencandioamide, poly(caproamide) and the like; polyimides such as poly[bis(oxdiphenylene)pyromellitimide)], poly(bisphenylenepyromellitimide), poly(bis(thiodiphenylene)-bis(oxyphthalimide) and the like; fluoropolymers such as fluorinated ethylene/-propylene, polytetrafluoroethylene produced by suspension polymerization, poly(trifluorochloroethylene), and the like, aldehyde polymers such as polyoxmethylene, polychloral and the like polycarbonates such as bisphenol-A carbonate, ethylene glycol carbonate and the like; polyester such as poly(ethylene terephthalate), acrylics such as poly(methylmethacrylate); cellusoics such as trimethylcellulose, silicones and vinyls.

The solid particulate filler starting material can be in the form of acicular, or irregular particles or in the form of flakes or, and preferably, a spherical configuration. The particulate material can be any of the metals, semimetals, metalloids, alloys, or intermetallic compounds. For example, it can be an element of atomic number 4, 5, 6, 12–14, 20–33, 38–51, 56–79, 81–83, 88, 90, and 92 such as, lead boron, diamond, graphite, iron, cobalt and the like. The particulate material can be alloys of these elements and combinations of the elements and alloys. The particulate material can include solid solutions, such as copper-nickel mixtures containing 1% to 99% copper in nickel, copper-zinc with up to about 35% zinc, copper-silicon containing up to 4% silicon; and two phase alloys, reactive and refractory metals such as titanium and its alloys such as titanium-aluminum, copper-titanium, vanadium-titanium or titanium-aluminum mixed with other metals such as manganese or tin, nickel based alloys. These compositions are described in Robert M. Brick, Structure and Properties of Alloys, 3rd. Edition, McGraw-Hill Book Company, New York, 1965.

Intermetallic compounds include borides, nitrides, carbides and silicides and comprise compounts of metals and semi-metals with boron, carbon, silicon and nitrogen and, for example, are TiC, WC, W$_2$C, SiC, NiB, silicon, nitride, MoSi$_2$, and the like. These materials are also commonly called abrasives.

The powdered ceramic materials which can be used in this invention are those which can be fused or sintered at temperatures of 500° to 2000° C. and include soda glass, porcelain, thoria, titania, alumina, rare-earth oxides, zirconia, barium titanate, berylium oxide, mangesium oxide and the like and mixtures of these materials.

Salts which can be used include sodium chloride, ammonium carbonate, borox, calcium carbonate, sodium sulfate and the like.

The invention is further illustrated by the following examples in which temperatures are expressed in degrees Centigrade, percentages are by volume unless otherwise indicated and mesh indicates passage through the designated United States Standard Mesh screen unless otherwise indicated.

EXAMPLE 1

The following mixtures of −150 mesh spherical nickel phosphorus alloy and DuPont 6C Teflon PTFE were weighed.

| Example | PTFE % by volume | PTFE | NiP Alloy |
|---|---|---|---|
| A | 3 | 0.66 g. | 79.4 g. |
| B | 5 | 1.1 g. | 77.6 g. |
| C | 10 | 2.2 g. | 73.5 g. |
| D | 15 | 3.3 g. | 69.5 g. |
| E | 20 | 4.4 g. | 65.5 g. |
| F | 25 | 5.5 g. | 61.4 g. |
| G | 30 | 6.6 g. | 57.3 g. |

| Example | PTFE % by volume | PTFE | NiP Alloy |
|---|---|---|---|
| H | 35 | 7.7 g. | 53.1 g. |
| I | 40 | 8.8 g. | 49.0 g. |

Each of the mixtures were separately dry milled in a one quart steel can containing 10 one-half inch steel balls for 20 minutes. With heated 1¼" diameter rolls set at 0.1" spacing, each sample was cross rolled with folding 12 times to form a sheet. Then in 0.010" steps the thickness of the mat was reduced to 0.015" to form a sheet.

Figure 4:
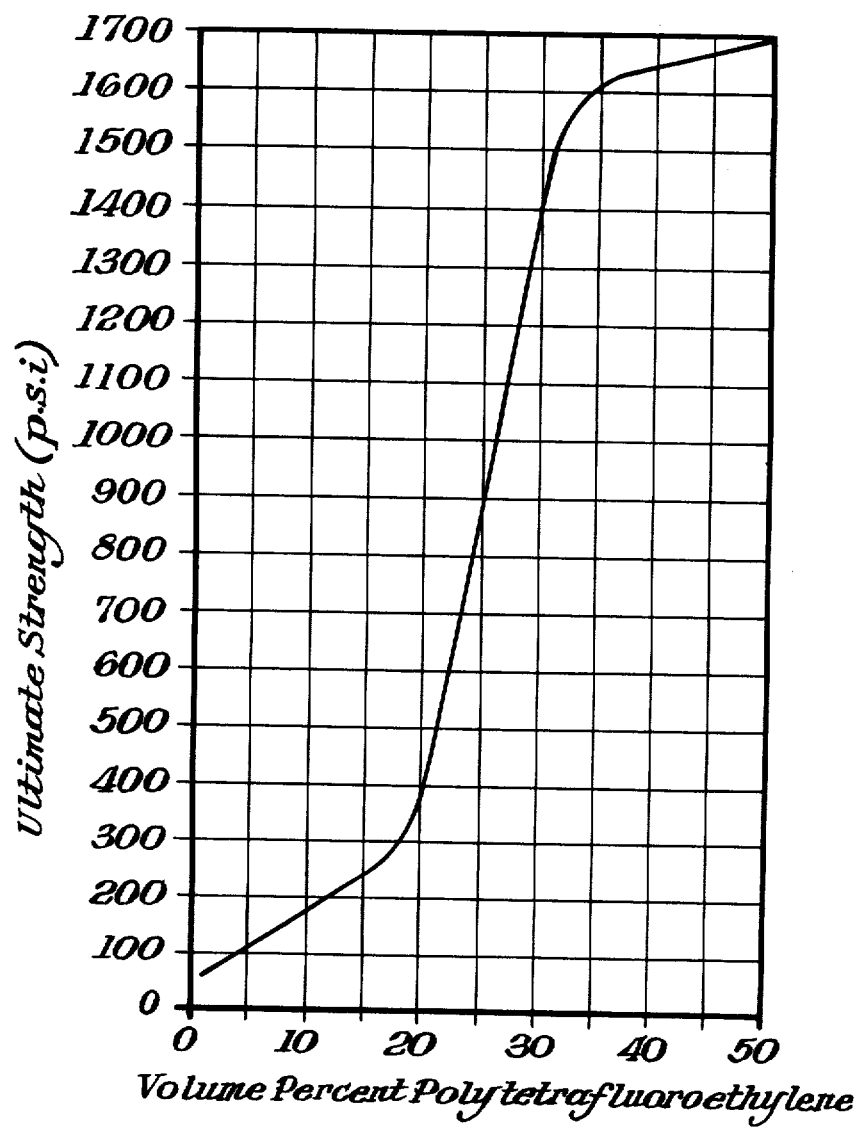
FIG. 4 is a plot of the ultimate strength expressed in pounds per square inch (p.s.i.) of compositions made in accord with this invention as a function of the percent by volume of the PTFE in the composition.

(a) The tensile strengths of samples A through I are shown in FIG. 4. The tensile measurements were made on an Instron tensile tester using clamp grips on a "dogbone" sheet specimen as described in ASTM A 370. The strain rate was maintained between 1" and 2" per minute after establishing that the tensile strength was insensitive to strain rate over this range.

The plot shown in FIG. 4 can be divided into three regions which reflect different tensile properties. Region I, Samples A through D, from about 20 volumes % of PTFE to 1 volume % of PTFE exhibits an average tensile strength of about 200 psi; while Region III, Samples H and I, from 35 volume % PTFE to 45 volume % PTFE exhibits an average tensile strength of about 1600 psi. Region II, Samples E, F and G, is a transition range from about 20 volume percent to 35 volume % PTFE in which the tensile strength varies from 300 psi to 1500 psi over the range of PTFE concentrations.

(b) Samples from the series described above were selected for structural analysis to determine what structural differences were responsible for the abrupt change in tensile strength of two and one-half fold between 20 and 30% PTFE discovered in part (a) of this Example. Samples of 3, 15 and 40 volume percent binder were observed at 3000× magnification using a scanning electron microscope.

The structural determinations were made using a JEOLCO JSM-U3 scanning electron microscope equipped with a TV rapid-scan attachment. The sheet samples were mounted on conductive specimen mounts and coated with a 60%, Au/40% Pt alloy using vacuum evaporation at a pressure of $10^{-5}$ Torr. The samples were placed in the microscope and all observations were made with the samples at a tilt angle of 45° to the incident beam and with an accelerating voltage of 25 kilovolts. Each sample was thoroughly scanned over the available surface area at the magnification in use with the TV rapid-scan attachment to ensure that the area selected for the photomicrograph was representative.

Figure 2:
FIG. 2 is a photomicrograph at the same magnification of a composition of the same PTFE polymer and filler, produced in accord with the present invention employing 85 volume percent of the braze alloy.
Figure 3:
FIG. 3 is a photomicrograph at the same magnification of a composition of the same PTFE and filler, produced in accord with the present invention employing 97 volume percent of the braze alloy.

Results of this examination are shown in the photomicrographs of FIGS. 1, 2 and 3 for 40, 15 and 3 volume percent PTFE, respectively. FIG. 1 at 40 volume percent shows a continuum of PTFE binder with ribbon-like spans between one mass of PTFE and another mass of PTFE. The basic structural element in FIG. 1 is the mass of PTFE and the Ni/P alloy particles shown in the photomicrographs as spheres imbedded or encapsulated in the PTFE mass.

FIGS. 2 and 3, however, show a unique fine structure in which the PTFE is in the form of fibrils or tendrils extending from the individual alloy particles and binding them together with a three dimensional cobweb-like fibril network. The basic structural element in FIGS. 2 and 3 is the fibrils or tendrils which has a high undirectional orientation along the fibril axis. The photomicrographs of FIGS. 2 and 3 show a marked absence of any form of PTFE except the tendrils in the interparticle void spaces. Most of the fibrils or tendrils have a diameter of less than one micron with a length to diameter ratio of 10 to 1 to 100 to 1 or greater.

(c) X-ray diffraction was used to examine the orientation of the sheet samples in the PTFE range which exhibit the fibril microstructural unit. All x-ray diffraction measurements were made using a General Electric Company XRD5 x-ray diffractometer using a Ni filter CuKα radiation. The intensity measurements were made with a scintillation counter and the specimens were held in a General Electric pole figure orienter. Film work was done using a Norelco Generator and film stand with a forward reflection Laue camera.

Samples were prepared using the procedure described in part (a) of this Example. Two sets of samples were made to permit beam incidence on the biaxial plane of rolling and beam incidence on the biaxial plane perpendicular to the direction of rolling. The specimens for incidence perpendicular to the rolling direction were such that the thickness for beam penetration was 1 to 2 mm thick. To avoid deformation in the cutting operation the samples were saturated with water to fill the void volume and then frozen. The cutting was then done on the frozen specimens. The metal was selectively removed by leaching in 3 parts nitric acid plus 1 part hydrochloric acid for 17 hours, leaving the PTFE structure.

The diffraction patterns taken in the biaxial plane of rolling was a ring of uniform intensity implying a random distribution of fibrils. A similar pattern was obtained in the biaxial plane perpendicular to the plane of rolling. Further studies on sheet made as previously described in this Example, except that the last few rolling passes were made in the same direction exhibited diffraction patterns with two regions of enhanced intensity separated by 180°. This type of pattern is characteristic of the well known "preferred orientation" encountered in deforming plastics, metals and other materials in which fibrils are oriented in the direction of deformation.

EXAMPLE 2

(a) 268 grams of −325 mesh tungsten carbide angular powder and 4.4 grams of E. I. duPont deNemours Co. duPont 6C Teflon PTFE were ball-milled in a one quart steel mill using 12 one-half inch steel balls for one hour until the mixture stuck together when pressed, which is the onset of fibrillation. The mixture of powders was transferred to 0.020" steel shim and rolled through 1½" diameter horizontal heated rolls set 0.1" part, to produce a weakly bonded layer of particles. The rolls were heated to a temperature of 90° C. This weakly bonded layer of particles was folded upon itself and rotated 90° C. and rolled again. The rolling, folding and cross rolling steps were repeated four times to produce a self-supporting sheet. This was cross rolled without the steel shim another 7 times to increase the amount of fibrillation and tensile strength of the sheet. The sheet was then reduced in thickness in steps of 0.010" to 0.030" thick. The resulting sheet possessed good strength and drapability.

(b) 146 grams of −150 mesh nickel phosphorous spherical powder and 4.4 of duPont 6C Teflon PTFE were ball milled in a one quart steel mill using 12 one-half inch steel balls for 20 minutes until the mixture stuck together when pressed. The mixture was transferred to a 0.020" steel shim and the mixture and shim were rolled through 1⅛" diameter horizontal rolls, heated to 90° C. The spacing between the rolls was 0.10". In two cross rolling steps with folding a self-supporting sheet was formed. Four additional cross rolling steps with folding conducted without the steel shim greatly increased the strength of the sheet. The sheet was then reduced in thickness in step of 0.010" to a thickness of 0.030". The resulting sheet possessed good strength and drapability.

EXAMPLE 3

The following mixtures of powdered tungsten carbide (−325 mesh) and PTFE (Teflon 6C) were weighed.

| Sample | Volume % tungsten carbide | Tungsten carbide | PTFE |
|---|---|---|---|
| A | 85 | 254 g. | 6.6 g. |
| B | 90 | 268 g. | 4.4 g. |
| C | 92.5 | 275 g. | 3.3 g. |
| D | 95 | 283.2 g. | 2.2 g. |
| E | 97 | 288.6 g. | 1.3 g. |

Each of the mixtures was separately ball milled for one hour in one quart steel containers containing 16 one-half inch steel balls.

A second set of the above mixtures was separately mixed for one minute in a blender containing 250 ml of refined kerosene. After blending, the solids were allowed to settle and excess kerosene was decanted. The mixture was allowed to drain until the kerosene content was about 35 to 45%, by volume.

Each of the above sets was cross-rolled with folding on a 0.020" steel shim through 1¼ inch diameter steel rolls set 0.12" apart.

The mixture containing kerosene was not allowed to become dry by using unheated rolls.

The results are as follows:

TABLE I

| Sample | Vol % Tungsten Carbide | Characteristic of product of dry process | Characteristic of product of wet process |
|---|---|---|---|
| A | 85 | Very tough sheet | Weak sheet but self-supporting and handleable |
| B | 90 | Strong sheet | Very weak sheet with marginal handleability |
| C | 92.5 | Strong sheet | Sheet too weak for practical handleability |
| D | 95 | Moderately strong sheet-could easily be handled | Could not make self-supporting sheet |
| E | 97 | Weak sheet but still self-supporting and handleable | Could not make self-supporting sheet |

These results show that mechanically working in the dry state unexpectedly provides a product having improved tensile strength.

EXAMPLE 4

To 80 volumes of 100 mesh lead powder was added 10 volumes polytetrafluoroethylene (400 micron particle size). The mixture was placed in a glass mill with ⅜ inch porcelain grinding medium and rotated at 150 RPM for two hours. The mixture produced appeared to be very uniform having a high degree of bonding of the lead particles. The mixture was rolled at 100°-150° C. once through the rolls to give a coherent sheet with enough strength to free roll. Four more rollings each at crossed direction after folding produced a 1 mm flexible sheet having good green strength. The sheet was sintered in 30 minutes into a rigid body in an air furnace set at 300° C. which is below the decomposition point of the poly(tetrafluoroethylene).

EXAMPLE 5

To 50 volumes of 40 mesh polypropylene resin was combined 20 volumes of polytetrafluoroethylene and 30 volumes of 100 mesh glass by dry mixing for two hours in a rotating glass jar containing one-half inch porcelain grinding balls. The mixture was placed in an aluminum foil and cross rolled seven times as described in Example 2. A flexible sheet was produced. The sheet was sintered into a rigid sheet containing polypropylene, glass and polytetrafluoroethylene by heating at 225° C. to effect bonding of the polypropylene.

EXAMPLE 6

To 90 volumes of 100 mesh spherical iron powder was combined 10 volumes of poly(tetrafluoroethylene) (400 micron) by the procedure given in Example 4. After seven cross rolls at 100°-150° C. a flexible sheet was produced. A circular section of this was placed in a 37 mm cylindrical die and compacted at 32 tons per square inch. The green strength of the spherical iron compact made by the procedure of this invention was excellent. It was sintered at 1150° C. for 30 minutes in dry hydrogen to form a dense strong disc.

EXAMPLE 7

To 90 volumes of 100 mesh irregularly shaped iron powder was combined 10 volumes of poly(tetrafluoroethylene) (400 micron) powder by the procedure given in Example 4. After eleven cross rolls at 100°-150° C. a rather weak flexible sheet was made. The sheet was pressed at 32 tons per square inch in a cylindrical die 37 mm in diameter. The resulting wafer had good green strength, and had an appearance similar to that of machined metal. This was sintered at 1150° C. in dry hydrogen for 30 minutes to produce a dense, strong, cylindrical disc of iron.

EXAMPLE 8

To 90 volumes of 100 to 325 mesh iron-nickel alloy was combined by the procedure given in Example 4, 10 volumes of high molecular weight polytetrafluoroethylene having an average particle size of 400±150 microns made by emulsion polymerization. After 8 cross rolls at 150° C., a relatively strong flexible sheet 1 mm thick was produced. A strip, 5 mm in width and 50 mm in length, was coiled in the form of a spiral or helix and then heated for 60 minutes at a temperature of 1150° C. in a hydrogen atmosphere. A rigid spiral spring of the iron-nickel alloy was produced.

A disc of the flexible sheet was sintered as described above to give a filter disc with a pore volume of about 30%. The porous disc was used to filter suspended particles from gasoline-containing carbon black.

EXAMPLE 9

The flexible iron-nickel sheet of Example 8 was laminated with a 0.2 mm flexible film of a nickel based alloy as follows: To 85 volumes of a nickel brazing alloy (14% Cr, 4% Si, 3% B, 4.5% Fe, 0.9 C and 73.6% Ni) was mixed 15 volumes of fibrillable polytetrafluoroethylene. The mixture was cross rolled as described in Example 4. After 5 cross rollings at 150° C. a flexible sheet 0.4 mm thick having good green strength was produced. The laminate was prepared by 5 rollings without folding of a strip of the flexible iron-nickel alloy filled sheet placed adjacent to a strip of the nickel braze filled sheet at 150° C. The laminate, having a thickness of 0.2 mm, was shaped around a soft sheet shaft with the nickel braze side adjacent to the soft steel shaft. The shaft with the flexible film was heated at 2200° F. in a dry hydrogen brazing furnace. An iron-nickel alloy-nickel composite metallurgically bonded to the soft steel shaft was produced. This hard coating had considerably greater wear resistance than the uncoated soft steel shaft.

Other coatings on substrates can be produced using the procedure of Example 9. The binding layer contiguous to the substrate on heating forms a bond between the substrate and the coating layer.

This process can be modified to coat a substrate with a metal, intermetallic compound, ceramic, plastic or combination thereof with or without the use of a bonding layer. In the process where no bonding layer is used, the unsintered composition containing the desired particulate is placed contiguous to the substrate followed by heating at a temperature sufficient to sinter and to bond the coating to the substrate. In this coating process the braze or hard facing alloy must have its melting point below that of the substrate. It also must wet the substrate and any abrasive filler that may be incorporated into the coating. In this manner, wear resistant, oxidative resistant and decorative coatings on substrates can be produced.

EXAMPLE 10

Four lead composite sheets were fabricated by the procedure given in Example 4. One sheet was stacked upon the other and hot rolled to reduce the thickness from 2 to 1 mm. The other two sheets were stacked and perforated with 1 mm holes, 2 mm apart in two dimensions. They were hot rolled as the unperforated sheets were. No holes were present after rolling.

The sheet processed by perforation was stronger, more flexible and more resistant to delamination compared to the sheet that had not been so processed.

EXAMPLE 11

Two iron composites were prepared as follows: (a) 90 volumes of irregularly shaped iron particles (90.3% of which were within the size range of 100 to 400 mesh) were combined with 10 volumes of polytetrafluoroethylene (400 micron) by dry rolling (as described in Example 4). Eleven hot cross rolls were needed to produce a coherent film. The strength of the sheet could not be improved by further rolling. (b) 90 volumes of irregularly shaped iron particles (60% of which were −100 +200 and 40% of which were minus 400 mesh in size) were combined with 10 volumes of polytetrafluoroethylene (400 micron) by dry mixing as described in Example 4. Nine 150° C. alternate cross rollings as described in Example 4 produced a coherent film having good green strength.

The composite film containing mostly coarse particles was weaker than the one containing a distribution of coarse (100 to 200 mesh) and fine (400 mesh) particles.

EXAMPLE 12

Two samples were prepared as follows:

(a) 80 volumes of lead powder, 93% of which was 325 mesh was combined with 20 volumes of polytetrafluoroethylene by dry mixing. After ten 150° C. cross rollings a very smooth sheet was produced.

(b) 80 volumes of lead powder, 70% of which was −100 +325 mesh and 30% −325 mesh, was prepared in the same manner as Example 11-a. Its final thickness was 1.2 mm.

The composite sheet containing 70% coarse (−100 to 325 and 30% fine (−325) was stronger and more flexible than the sheet produced solely from 325 mesh powder. The sheet of (b) above was extremely flexible as demonstrated by the ability to flex it back and forth over itself and to bend it around a ⅛ inch radii.

EXAMPLE 13

The effectiveness of the flexible lead film prepared in Example 12-b as an x-ray shield was compared to that of pure lead sheeting. Rectangular sections of each were placed over a photographic plate containing x-ray sensitive films and exposed to 60 kilovolt x-rays. Results obtained are as follows:

| Shield | Thickness | % of x-rays absorbed |
| --- | --- | --- |
| Lead foil | 1 mm | 100% |
| Flexible lead sheet of this invention | 1.2 mm | 100% |

These results demonstrated that the flexible lead containing sheets of this invention are effective absorbers of x-rays and are, therefore, useful to protect plants, animals and other objects from sources of x-rays.

EXAMPLE 14

The flexible lead film prepared in Example 12-b was laminated with polyethylene by placing the lead film between two films of polyethylene having a thickness of 0.025 mm and hot rolling at 105° C. to form a laminate which was strong, flexible and retained x-ray shielding properties.

EXAMPLE 15

The laminated flexible lead film prepared in Example 14 was further laminated on one side to double-backed adhesive tape. This composite was wrapped around a glass reactor collar with the adhesive side stuck to the glass. The adhesive effectively held the shielding in place and the flexibility of the film allowed it to conform to the complex geometry of the collar.

EXAMPLE 16

To the flexible lead film prepared in Example 12-b was laminated a flexible film containing barium sulfate prepared as follows: 70 volumes of 400 mesh barium sulfate were dry mixed with 30 volumes of polytetrafluoroethylene by the procedure used in Example 4. Seven cross roll steps, with five of the steps being without an aluminum foil support, were carried out at 150° C.

yielding a smooth flexible film 0.5 mm thick. The lead film of Example 12-b was intercalated between two layers of the barium sulfate flexible film and rolled without folding at 150° C. The combined thickness was reduced to 0.8 mm. A smooth flexible, coherent laminated film was produced. Part of this was further hot rolled to a thickness of 0.1 mm. Continuity of all three layers were maintained. The film was extremely flexible. These were heated to sterilization temperatures with absolutely no change in properties.

EXAMPLE 17

The flexible lead film prepared in Example 12-b was laminated to polyvinylchloride film and a woven polyester cloth (polyethylene terephthalate) by the procedure as follows:

Mating surfaces of the flexible film and the polyvinyl chloride and cloth were cemented and then pressed into place with a light rolling to eliminate wrinkles. The lead film was completely and intimately bonded to the second material with essentially no loss in flexibility and a great increase in strength and tear resistance.

EXAMPLE 18

Lead sheets as prepared in Example 12(a) were laminated with lead sheet as prepared in Example 12(b) by placing them in juxtaposition and pressing them together with a plate vibrating in a plane parallel to the sheets. The two sheets were well bonded together.

EXAMPLE 19

(a) By the methods of Example 19(b), fibrillated PTFE cloth containing 3 Vol.% 6C Teflon PTFE and 97 Vol. % of a particulate corrosion and wear resistant alloy having a screen size of −150 mesh and a composition, by weight, C, 0.60%; B, 3.35%; Cr, 15.0%; Fe, 2.5%; Si, 4.00%; Mo. 2,75%, Cu, 2.75% and the balance Ni was made. The cloth was rolled to a thickness of 0.020". This was cemented around the circumference of a ¼" diameter by 3" length shaft using shellac as the adhesive. The assembly produced was slowly heated in dry hydrogen (dew point of less than −30° F.) to 1040° C. and then at that temperature for 10 minutes. The assembly was cooled to room temperature and removed from the furnace. A pore free coating 0.012" thick and metallurgically bonded to the shaft was produced.

(b) The procedure of Example 19(a) was repeated using a −150 mesh alloy haing a composition, by weight, Si, 4.0%; B, 2.5%; Cr. 11.0%; Fe, 3.0%; and Ni Balance. The cloth produced was cemented on a diameter valve seat and the resulting assembly was heated to a temperature of 1010° C. instead of 1040° C. A pore free coating 0.012" thick metallurgically bonded to the valve seat was produced.

EXAMPLE 20

(a) A PTFE filled cloth was prepared by the procedure given in Example 19(a) using the following ingredients:

| 58 Volume % | -150 mesh | P-11%, Ni-balance |
| 58 volume % | -325 mesh | tungsten carbide |
| 4 volume % | Teflon | 6C PTFE |

The thickness of the resulting cloth was 0.025". This was glued with shellac to the large faces of a ¼"×2"×3/4" steel bar. This assembly was heated slowly to 900° C. in a dry hydrogen atmosphere and then cooled to room temperature. A crack free, pore free, metallurgically bonded coating was the result. The Ni/P alloy has a sharp melting point of 877° C. (solidus and liquidus=877° C.).

(b) Example 19(a) was repeated using a broad melting point braze alloy powder in place of the Ni/P alloy powder. The braze alloy had a composition, by weight, of: C, 0.75%; Cr, 13.5%; B, 3.00%; Si, 4.25%; Fe, 4.75%; and Ni-balance, and a melting point range of 895° to 1065° C. The coated bar was fired at 1100° C. instead of 900° C. The product obtained was extensively brazed, however, this product would be useful for a gripping bar.

However, the preferred product is one which is brazefree, preferably prepared from an alloy that has a relatively sharp melting point, i.e., the difference between the solidus temperature and liquidus temperature is less than 10° C.

The unsintered products are useful to fabricate hard-to-fabricate metals obtainable in the form of powders. This is accomplished by forming fibril-metal loaded green sheets shaping sheets into intricate form and then sintering into the desired shape. The sheets of these metals and also ceramic and plastic filled sheets can be forged or mechanically or hydrostatically pressed into intricate shapes and then sintered. The flexible unsintered sheets can be placed onto shaping dies and forged into a final form or intricate shape at temperatures of 200° to 2000° C.

The unsintered, fibril-containing compositions of this invention are useful for fabricating powders that until this invention could not be readily fabricated by powder metallurgy because of the inability to produce a compact having sufficient green strength. For example, spherical powders are normally very difficult to fabricate by sintering because it is difficult to prepare a shaped object of the spherical particles having sufficient green strength to handle and to sinter. The processes of this invention produce objects from these difficult to fabricated powders having superior green strength relative to that of other binders and thus make even these type of powders amenable to fabrication by sintering.

The compositions of this invention can be used in making metal to metal, metal to ceramic, metal to plastic and ceramic to plastic laminates. For example, sheets of materials containing metal on one side and glass on the other so that when it is sintered one obtains glass-coated metal. This same technology can be used for making graduated filters by starting with a layer of bonded metal followed by a layer of metal plus a soluble salt which could be leached out to form a more porous layer. Sintering or fusion temperature can be adjusted to achieve the desired densification. Layered structures made by this process could be used to make capacitors in which a layer of dielectric material is intercalated between metallic conductor layers.

Another embodiment of metal composites of this invention is a laminated film containing a brazing alloy powder on one side and a wear resistant alloy on the other side. It is used to produce a wear resistant surface on soft metal shaft. Brazing is accomplished by placing the soft metal side of the laminate adjacent to the soft metal and heating in an appropriate atmosphere to effect the melting of the brazing alloy. Continued heating can be used to effect further sintering of the wear-resistant alloy. Upon cooling, a wear resistant coating on the metal substrate is produced.

Flexible metal and ceramic sheets of this invention laminated with impervious films can be shaped by isostatic compaction into complex shapes which can be fused or sintered.

Some of the compositions of this invention are useful for making orthopedic casts. For example, a sheet containing particles bonded with PTFE fibrils is shaped to form a cast, and heated to sinter the plastic and fibril particles. This then is placed back on the bodily extremity. A variation of this process involves including glass fiber in the composition to provide reenforcing and to give added rigidity. Still another variation would be to make a composite of thermoplastic, reenforcing material, and heating wires so that the structure could be sintered by passing current through the wire which would generate enough heat to cause the particles to fuse into a rigid body.

The metal filled unsintered flexible sheets are useful as a radiation shield to protect humans, animals and inanimate objects against high energy radiation such as alpha particles, neutrons, beta particles and gamma and x-radiation. For example, a 1.0 mm solid sheet of lead has about the same shielding of x-rays as does a 1.2 mm thick fibril-lead sheet containing 80 volume percent lead. The flexible lead-filled sheeting is useful in the form of wearing apparel such as gloves, aprons, suits and the like to be worn to protect persons exposed to x-rays and as a structural component to be used in buildings housing sources of these radiations. The composition can be used in the form of sheeting to isolate x-ray producing devices and can be easily cut into the form of a facial or body shield of specific areas of a person undergoing radiation treatment.

The lead-filled composition can be laminated to polyvinyl chloride sheeting to give a laminate having improved flexibility, strength and soiling resistance compared to the unlaminated lead-filled unsintered sheets. The flexible sheets of these compositions are desirable compared to the stiff lead-filled polyvinyl chloride radiation shields commercially available that contain about 30, by volume, of lead.

Laminated flexible lead films of this invention having adhesive on one side can be used as x-ray absorbing wall covering in rooms, linings for housing where x-rays are generated such as in television, and other structural components. Sheets (20 mils or greater) can also be used.

Preferably the lead-filled x-radiation shields contain from 30 to 99 volume percent lead or compounds of lead.

Neutron shields can be prepared from the flexible fibril-containing sheets containing from 70 to 99 volume percent boron or boron-containing compounds.

The neutron shields can be in the form of gloves, aprons, suits and the like. These articles of manufacture can be worn to protect persons exposed to a neutron source.

An all purpose radiation shield to protect a person from alpha and beta particles, neutrons and x- and gamma radiation is another embodiment of this invention. This composition is produced by either laminating a flexible sheet of this invention filled with 30 to 99 volumes of lead with a flexible sheet containing 30 to 99 volumes of boron. Alternatively, a mixture of lead and boron powders mixed with a fibrillated resin can be prepared as described above to give flexible fibril-filled material which is useful as an all purpose radiation shield. Both of these compositions can be strengthened by lamination with polyvinyl chloride film or other polymer films.

The flexible plastic containing unsintered sheets of this invention can be laminated to polytetrafluoroethylene film to give a laminate in the form of a tape. The plastic filled side of the tape can be bonded with adhesive.

The process of this invention can be used to prepare specific articles of manufacture such as the heat pipe (Ref. A. Thomas Feldman et al., *Application of the Heat Pipe*, Mechanical Engineering, November, 1968, pages 48–53 and reference therein) which is produced from layers of material of varying porosity. A miniature heat pipe for electric tube, heat dissipation can be made by layering according to this invention as follows: (going from one side to another) (1) an impervious layer of metal, (2) a layer of metal containing small pores for capillary flow of a liquid (3) a layer containing larger pores for vapor transport (4) a layer containing small pores for capillary flow of the liquid and (5) a layer of impervious metal. The layers are sealed at the edges by soldering prior to filling the heat pipe with a heat transfer fluid by techniques well known in the art.

The compositions of this invention are useful for preparing catalysts and catalyst supports. Particulate activated alumina can be converted into a flexible sheet by the processes described above. Porosity can be controlled by incorporating with the alumina soluble or volatile materials that can be removed after the sheet is formed to generate voids. The alumina can then be loaded with active catalyst by subsequent chemical reactions. Because the binding matrix is polytetrafluorocarbon resin it can be used at elevated temperatures, up to 300° C.

Particulate catalyst such as iron and Raney nickel can be compounded by the procedures of this invention to yield a strong flexible sheet. As previously described, porosity can be introduced into the films to facilitate diffusion of reactants into and products out of the catalyst systems of this invention.

The catalyst embodiment includes a process for a heterogenous catalytic reaction comprising contacting a reaction mixture with a flexible film or a sintered composition of this invention. A process for the heterogenous catalytic polymerization of ethylene, propylene, alpha-olefins, mixtures of these and mixtures of these with diolefins to polymers including high molecular weight polymers having molecular weights in excess of 10,000 can be conveniently conducted using a sintered aluminatitania ceramic produced as described above. The sintering can be conducted at temperatures of about 400° to 900° C. in an inert, oxidizing or reducing atmosphere. The reducing atmosphere includes hydrogen or the vapor of an alkali or alkaline-earth metal such as sodium, potassium, calcium, magnesium and the like. The compositions of this invention are also useful in catalytic hydrogenation process. For example, the filled embodiment using an aluminum-nickel alloy as the particulate filler can be reacted with alkali to produce a flexible Raney nickel-filled composition useful as a catalyst for the hydrogenation of olefinic hydrocarbons and compounds such as unsaturated fats, benzene, alpha-olefins and the like.

Sintered composites of this invention comprising metals and ceramics are also useful in catalytic processes. For example, a sintered metal-ceramic composite such as nickel-alumina, a platinum-alumina and the like prepared as described above are useful as catalysts in hydroforming process wherein straight chain hydrocarbons are converted to aromatic hydrocarbons and for the catalytic cracking and isomerization process wherein hydrocarbons are isomerized. The catalytic process can be conducted at temperatures of room temperature to 300° C. or higher for hydrogenation and isomerization processes and at 200° to 400° C. for catalytic cracking and hydroforming processes, and 200° to 600° C. for catalytic oxidation processes. It is convenient to conduct these processes at pressures of 1 atmosphere to 2000 atmospheres.

The use of metal filled flexible composites for brazing or hardfacing of metals has been described above. Preferably, a flux is used to assist the bonding of the brazing composite to the metal when fusion is done in air. Fluxes used for this purpose are well known in the art and include boric oxide, metallic fluorides and chlorides. The decomposition of the polytetrafluoroethylene moiety of the flexible sheet is believed to liberate, under certain conditions, hydrofluoric acid which can also serve as a flux. Brazing or hardfacing can be conducted at the sintering temperature of the composite as described above. In the brazing composites, one layer contains a hard metal or hard alloy and the other layer contains a bonding metal which when heated acts to cement the hard metal or alloy to the metal being brazed. A braze alloy is a non-ferrous alloy having a solidus temperature of at least 800° F. that wets the materials being joined and has a melting range lower than the materials being joined. Braze Manual, American Welding Society, United Engineering Center, 345 East 47th Street, New York, N.Y., 1963, page v.

The unsintered compositions are useful in a process for the chromatographic separation of chemical compounds placed in contact with an unsintered composition containing absorbants such as charcoal, silica gel activated alumina and the like. The absorbant absorbs the chemical compounds. A fluid is passed over the unsintered composition to selectively desorb and separate the chemical compounds. The process can be conducted in either a gas or liquid state. These compositions can also be used to absorb oils and odors.

Another use for the unsintered compositions described herein is in a process for acoustical damping comprising absorbing sound waves with an unsintered composition. The lead filled compositions are preferred in this process. Sheets of the lead-filled compositions can be placed in the housings of electric motors and other electric equipment to absorb sound waves produced to eliminate noise. The lead-filled sheets can also be used in structural components of buildings to eliminate or minimize noise.

The foregoing detailed description has been given for clarity of understanding only and no unnecessary limitations are to be understood therefrom. The invention is not limited to the exact details shown and described for obvious modifications will occur to those skilled in the art.

We claim:

1. A flexible, self-sustaining, dropable, sheet consisting essentially of from about 85 to about 99 percent, by volume of a solid sinterable particulate material substantially uniformly distributed in a matrix of from about 1 to about 15 percent by volume of fibrillated polytetrafluoroethylene resin, the fibrils of said polytetrafluoroethylene interconnecting and entrapping said sinterable particulate material to impart a self-sustaining condition and flexibility to said sheet.

2. The sheet of claim 1 wherein the sinterable particulate material is selected from the group consisting of ceramics, metals, intermetallic compounds, synthetic organic polymers or mixtures thereof.

3. The sheet of claim 1 wherein the sinterable particulate material is a brazing alloy, an intermetallic abrasive material selected from the group consisting of metallic carbides, nitrides, borides and silicides, or mixtures thereof.

4. The sheet of claim 3 wherein the abrasive is tungsten carbide, chromium carbide, tantalum carbide, titanium carbide, molybdenum carbide, silicon carbide, boron carbide or diamond.

5. The sheet of claim 3 wherein the brazing alloy is a hardfacing alloy selected from the group consisting of a nickel, cobalt or iron based alloy having a Rockwell hardness on the C scale of at least 40.

6. The sheet of claim 3 wherein the brazing alloy is a nickel, cobalt, copper or silver based alloy with a melting point of less than 1200° C.

7. The sheet of claim 1 containing from about 95 to about 99 percent by volume of the sinterable particulate material and from about 1 to about 5 percent by volume of fibrillated polytetrafluoroethylene.

8. A laminate composed of a first sheet and a second sheet, each sheet having the composition according to claim 1, at least one of the particle size of the sinterable particulate material, the percent by volume of the sinterable particulate material and the nature of the sinterable particulate material in one of said sheets being different from at least one of the particle size of the sinterable particulate material, the percent by volume of the sinterable particulate material and the nature of the sinterable particulate material in the other sheet.

* * * * *